(12) United States Patent
Kubo et al.

(10) Patent No.: US 8,911,618 B2
(45) Date of Patent: Dec. 16, 2014

(54) LIQUID-LEVEL FOLLOWING TYPE SUCTION APPARATUS AND FLOATING OIL COLLECTING SYSTEM HAVING THE SAME

(75) Inventors: Tetsuo Kubo, Sagamihara (JP);
Kazunori Abe, Sagamihara (JP)

(73) Assignee: Eishin Techno Ltd., Sagamihara-shi, Kanagawa (JP)

( * ) Notice: Subject to any disclaimer, the term of this patent is extended or adjusted under 35 U.S.C. 154(b) by 546 days.

(21) Appl. No.: 13/383,380

(22) PCT Filed: Apr. 26, 2010

(86) PCT No.: PCT/JP2010/057369
§ 371 (c)(1),
(2), (4) Date: Jan. 10, 2012

(87) PCT Pub. No.: WO2011/013422
PCT Pub. Date: Feb. 3, 2011

(65) Prior Publication Data
US 2012/0111779 A1    May 10, 2012

(30) Foreign Application Priority Data

Jul. 28, 2009 (JP) ................................. 2009-174960
Oct. 8, 2009 (JP) ................................. 2009-234188

(51) Int. Cl.
| | | |
|---|---|---|
| B01D 17/02 | (2006.01) | |
| C02F 1/40 | (2006.01) | |
| B01D 21/24 | (2006.01) | |
| C02F 1/68 | (2006.01) | |
| E02B 15/10 | (2006.01) | |
| C02F 1/20 | (2006.01) | |

(52) U.S. Cl.
CPC ........ B01D 17/0214 (2013.01); B01D 21/2433 (2013.01); *E02B 15/106* (2013.01); *C02F 1/20* (2013.01); *C02F 1/40* (2013.01); C02F 1/681 (2013.01)
USPC .......................... 210/121; 210/242.3; 137/578

(58) Field of Classification Search
None
See application file for complete search history.

(56) References Cited

U.S. PATENT DOCUMENTS 1,450,545 A * 4/1923 Hans .............................. 210/122

FOREIGN PATENT DOCUMENTS

| | | |
|---|---|---|
| JP | S58-149726 | 9/1983 |
| JP | S62-183825 | 8/1987 |

(Continued)

OTHER PUBLICATIONS

Korean Patent Office, "Office Action for KR 10-2011-7030430", Apr. 12, 2013.

*Primary Examiner* — Terry Cecil
(74) *Attorney, Agent, or Firm* — Manabu Kanesaka

(57) ABSTRACT

A floating oil collecting system which can collect floating oil containing a very small amount of water is provided. The system includes a liquid-level following type suction apparatus having an intake pipe in which one end is an inlet side end opening upwardly and the other end is connected with an inlet port of a pump, a float which causes the inlet side end to closely follow a liquid level within liquid in a storage tank, and an adjustment pipe which is loosely fitted to the inlet side end of the intake pipe so as to be movable up and down movement, in which an upper end opening edge is an inlet opening; a separation tank which receives an oil/water mixture from the storage tank to separate the mixture into oil and water; a pump for sucking up the oil/water mixture from the storage tank so as to be supplied to the separation tank; and a deaerator for removing air in the oil/water mixture sucked up from the storage tank.

13 Claims, 14 Drawing Sheets

(56) References Cited

FOREIGN PATENT DOCUMENTS

| | | |
|---|---|---|
| JP | S63-001412 | 1/1988 |
| JP | S63-144894 | 9/1988 |
| JP | H05-192509 | 8/1993 |
| JP | H10-028968 | 2/1998 |
| JP | 2001-252653 | 9/2001 |
| JP | 2001-327965 | 11/2001 |
| JP | 2003-225658 | 8/2003 |
| JP | 2004-305847 | 11/2004 |
| JP | 2006-061894 | 3/2006 |
| JP | 2006-110452 | 4/2006 |
| KR | 1994-0007470 Y1 | 10/1994 |
| KR | 10-2001-0019491 | 3/2001 |

* cited by examiner

Fig. 3
Fig. 3(a)
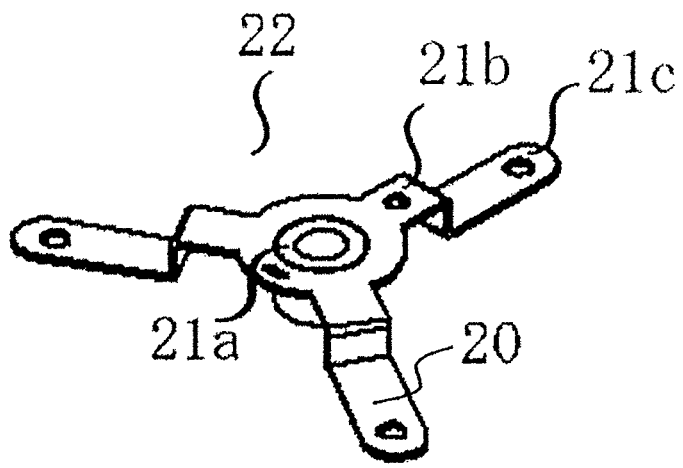
Fig. 3(b)
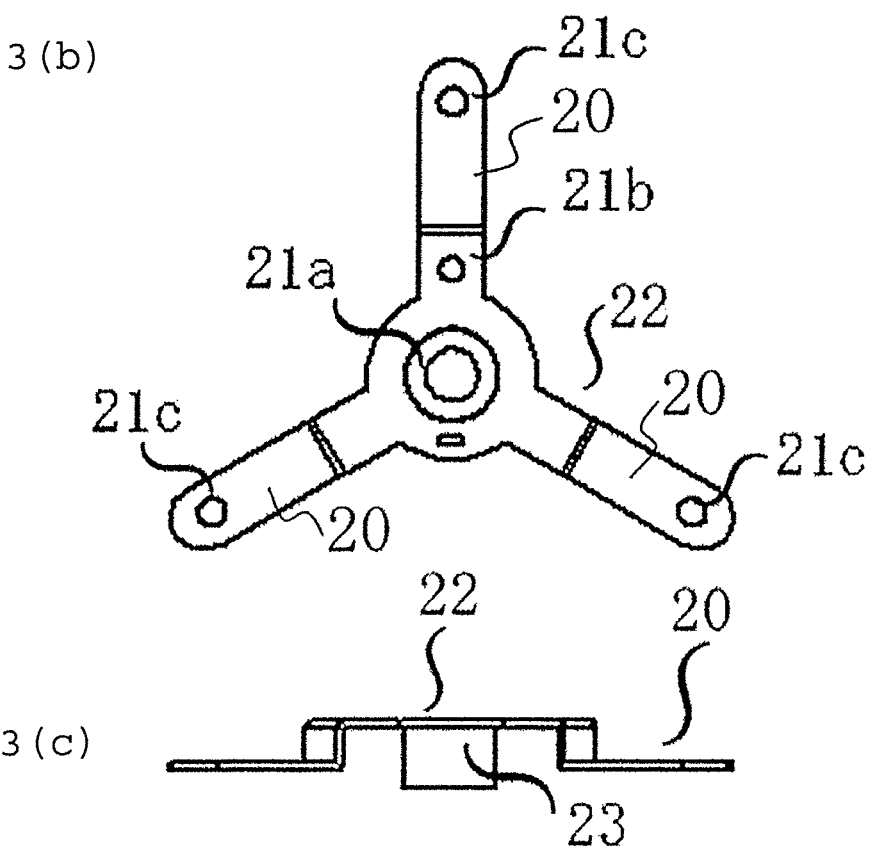
Fig. 3(c)

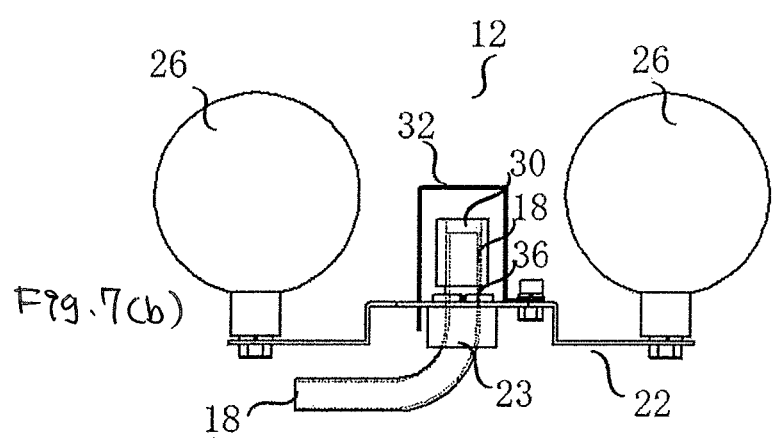

LIQUID-LEVEL FOLLOWING TYPE SUCTION APPARATUS AND FLOATING OIL COLLECTING SYSTEM HAVING THE SAME

TECHNICAL FIELD

The present invention relates to a liquid-level following type suction apparatus and floating oil collecting system having the same for sucking and collecting oil components (such as hydraulic oil and lubricating oil) having surfaced to a liquid level of an oil/water mixture in which water and oil, such as working fluid (water-soluble coolant), washings, and cooling fluid, are mixed.

BACKGROUND ART

Conventionally, it is known to separate oil and water from the oil/water mixture using a floating oil collecting system (see Patent Documents 1 and 2). In such a floating oil collecting system, the oil/water mixture accumulated in storage tanks, such as a machine-tool coolant tank and a cleaning solvent tank, is sucked up with a pump, fed to a separation tank through an inflow pipe, so that the mixture may be separated into water and oil to be at a lower phase and an upper phase within this separation tank by the difference in specific gravity. The separated oil is collected through a discharge hose in a collecting container. The collected oil is suitably disposed of as waste fluid. The remaining liquid (water) where oil is removed is returned to the storage tank from the separation tank so as to be reused.

Further, it is conventionally known that a tip (suction inlet) of a suction hose of a pump is supported with a float apparatus in a storage tank, and the suction is carried out by floating the suction inlet at all times to follow a liquid level of the oil/water mixture in this storage tank (see Patent Document 1 and 2).

PRIOR ART DOCUMENT

Patent Documents

Patent Document 1: Japanese Patent Application Publication No. 2004-305847
Patent Document 2: Japanese Patent Application Publication No. 2006-61894

SUMMARY OF THE INVENTION

Problems to be Solved by the Invention

In the case of sucking oil which has surfaced to a liquid level of the oil/water mixture, if a suction inlet is too far from the liquid level, a lot of water is sucked. If it is too close to the liquid level, a lot of air is sucked. In either case, the efficiency of collecting the floating oil worsens. In other words, in order to improve the collecting efficiency of oil, it is necessary to hold the suction inlet in the optimal position under the liquid level. However, only if the float apparatus follows the liquid level, a distance between the liquid level and an inlet port changes with the properties and a thickness of the floating oil as well as temperatures of oil and water.

Therefore, in order to improve the collecting efficiency, it is necessary for the suction inlet to be adjusted to be in the optimal position under a surface in response to changes in the properties and thickness of the floating oil as well as the temperatures of oil and water, for example.

The present invention arises in order to solve said problems, and it aims at providing a liquid-level following type suction apparatus which holds a suction inlet in the optimal position under a liquid level without adjusting and a floating oil collecting system in which floating oil containing a considerably reduced amount of water can be collected quickly by means of a liquid-level following type suction apparatus.

Means to Solve the Problems

A liquid-level following type suction apparatus in accordance with the present invention made in order to solve the above-mentioned problems is a liquid-level following type suction apparatus comprising an intake pipe in which one end is an inlet side end opening upwardly, and the other end is connected with a suction hose which communicates with an inlet port of a pump, a holding member fixed to the above-mentioned intake pipe and having an extension portion which extends outwardly, a float body attached to the above-mentioned extension portion of the above-mentioned holding member and causing the above-mentioned inlet side end of the above-mentioned intake pipe to closely follow a liquid level within the liquid, an adjustment pipe which is loosely fitted to the above-mentioned inlet side end of the above-mentioned intake pipe through a clearance so as to move up and down, its upper opening edge serving as an inlet opening, wherein the above-mentioned liquid flows from the lower end of the above-mentioned adjustment pipe into the above-mentioned clearance between the adjustment pipe and the intake pipe, the above-mentioned liquid rises within the clearance and is sucked into the intake pipe, and the above-mentioned liquid is sucked from an upper end side of the above-mentioned adjustment pipe into the intake pipe.

In this liquid-level following type suction apparatus, since the adjustment pipe is provided at the inlet side end of the intake pipe so as to be movable up and down, the inlet opening of the adjustment pipe is always held in a proper position with respect to the liquid level. Thus, it is possible to collect the floating oil efficiently and reduce the amount of water contained in the collected floating oil considerably.

Here, it is preferable that a washer is provided in a position to face a bottom end face of the above-mentioned adjustment pipe of the above-mentioned holding member, the above-mentioned washer placing thereon the above-mentioned adjustment pipe so as not to shut a clearance between the above-mentioned intake pipe and the above-mentioned adjustment pipe. The adjustment pipe can thereby be moved smoothly to the proper position immediately after starting the pump.

Further, it is preferable that the liquid-level following type suction apparatus comprises a strip-like stopper in which one end is fixed to the above-mentioned holding member, and the other end is arranged to face an outer end face of the above-mentioned adjustment pipe at a predetermined distance so as to prevent the above-mentioned adjustment pipe from escaping. The stopper can prevent the adjustment pipe from escaping and missing.

Further, the above-mentioned adjustment pipe is preferably a tubular member formed of a resin with a specific gravity of greater than one (1) and has an inner diameter larger than an outer diameter of the above-mentioned upper end of the above-mentioned intake end pipe. Since the adjustment pipe is formed of a resin with a specific gravity of greater than one (1), it is possible to hold the inlet opening of the adjustment pipe in the proper position with respect to the liquid level when sucking the liquid.

Further, a liquid-level following type suction apparatus in accordance with the present invention made in order to solve the above-mentioned problem comprise an intake pipe arranged to be upstanding, its upper end being connected with a suction hose which communicates with an inlet port of a pump, a holding member fixed to the above-mentioned intake pipe and having an extension portion which extends outwardly, a float body which is attached to the above-mentioned extension portion of the above-mentioned holding member and causes a bottom part of the above-mentioned intake pipe to closely follow a liquid level in the liquid, a pan spaced from the bottom part of the above-mentioned intake pipe by a suitable distance, and an adjustment pipe which is loosely engaged with the outer periphery of the above-mentioned pan through a clearance so as to move up and down, its top opening edge acting as the inlet port, wherein the above-mentioned liquid flows from the lower end of the above-mentioned adjustment pipe into the above-mentioned clearance between the adjustment pipe and the above-mentioned pan, rises within the clearance and is sucked into the intake pipe, as well as sucked from an upper end side of the above-mentioned adjustment pipe into the intake pipe.

Since the adjustment pipe of the liquid-level following type suction apparatus in accordance with the present invention is provided at the inlet side end of the intake pipe so as to be movable up and down, the inlet opening of the adjustment pipe is always held in a proper position with respect to the liquid level. Thus, it is possible to collect the floating oil efficiently and reduce the amount of water contained in the collected floating oil considerably. In addition, since the opening of the bottom part of the intake pipe is mounted downwards, it is possible to suck the liquid even if the liquid level is low.

The above-mentioned pan is preferably arranged to face, in the liquid, the bottom part of the above-mentioned intake pipe and its rim surrounds the bottom part of the above-mentioned intake pipe.

Since the bottom part of the intake pipe is surrounded by each rim of the pan and the adjustment pipe, the liquid turns around an upper line of each rim of the pan and the adjustment pipe when sucking the oil/water mixture. Thus, the floating oil near the liquid level is sucked first, resulting in a good extraction efficiency of the floating oil.

Further, the liquid-level following type suction apparatus preferably comprises a plate-like stopper which is arranged to face the bottom of the above-mentioned pan at a predetermined distance so as to prevent the above-mentioned adjustment pipe from escaping. The stopper can prevent the adjustment pipe from escaping and missing.

Further, the above-mentioned adjustment pipe is preferably a tubular member formed of a resin with a specific gravity of greater than one (1) and has an inner diameter larger than an outer diameter of the above-mentioned pan.

Since the adjustment pipe is formed of a resin with a specific gravity of greater than one (1), it is possible to hold the inlet opening of the adjustment pipe in the proper position with respect to the liquid level when sucking the liquid.

Further, a floating oil collecting system having the liquid-level following type suction apparatus in accordance with the present invention made in order to solve the above-mentioned problem comprises a separation tank which receives the oil/water mixture from the storage tank and separates the mixture into oil and water by the difference in specific gravity; a suction hose in which one end is connected with the inlet port of said pump and the other end is connected with the intake pipe of said liquid-level following type suction apparatus; a lead pipe which is arranged in the vertical direction at an upper part of said separation tank, its upper end being closed, and its lower end being open; an inflow pipe in which one end is connected to a discharge port of said pump and the other end is connected to a portion of said lead pipe projecting from an upper surface of said separation tank; and an opening which is provided for said lead pipe and causes the air contained in said oil/water mixture to escape outside.

In the floating oil collecting system having the liquid-level following type suction apparatus in accordance with the present invention, since the lead pipe is arranged to allow the oil/water mixture to flow downwards from the upper part of the separation tank, the oil/water mixture accumulated in the separation tank is not substantially influenced by pulsation, and the phenomenon of vertical vibration does not take place. Therefore, the phenomenon does not arise in which the separated oil and water are mixed again by vertical vibration, it is possible to collect the floating oil efficiently, and the amount of water contained in the collected floating oil can be reduced considerably. The air contained in the received oil/water mixture is discharged from the lead pipe to an upper space through the opening and hardly flows into the separation tank. Thus, air bubbles hardly move up to the liquid level in the separation tank and the phenomenon does not arise in which the separated oil and water are mixed again due to the presence of the air bubbles. Therefore, the amount of water contained in the collected floating oil can be reduced considerably.

It is preferable that the above-mentioned lead pipe is arranged at an upper part the above-mentioned separation tank so as to be vertical and fixed to an inner wall of the above-mentioned separation tank, the above-mentioned inflow pipe is arranged outside the above-mentioned separation tank so as to be vertical, joined, from a lower part, to an interconnecting tube joined to the above-mentioned lead pipe, and connected with the above-mentioned lead pipe through the above-mentioned interconnecting tube, a board is provided which is inclined upwardly to the above-mentioned interconnecting part from an opposite wall of the above-mentioned lead pipe opposed to an interconnection part between the above-mentioned interconnecting tube and the above-mentioned lead pipe, a clearance is provided between a tip of the above-mentioned upwardly-inclined board and the above-mentioned interconnecting tube, the above-mentioned opening is provided above the inter connection part of the above-mentioned lead pipe at the above-mentioned interconnecting tube, and a cross-sectional area of a lower part of the above-mentioned lead pipe is arranged to be gradually reduced towards its tip.

Since the interconnecting tube is perpendicularly joined to the inflow pipe and the lead pipe, a traveling speed of the oil/water mixture can be lowered. Further, an inflow rate of the oil/water mixture to the separation tank becomes low, it flows in a narrow range of the surface quietly, generation of air bubbles is suppressed, and the amount of water contained in the collected floating oil can be reduced considerably.

Further, the floating oil collecting system preferably comprises a casing A, provided in the above-mentioned separation tank, in which a top is open, an upper end of a side on the above-mentioned lead pipe side is located below the upper end of the above-mentioned separation tank, an upper end of the other side is flush with an upper end of the above-mentioned separation tank, left and right sides viewed from the lead pipe side are joined to the inner walls of the separation tank, so as to receive the floating oil floating in the above-mentioned separation tank from the above-mentioned lead pipe side end face; a casing B in which a top is open, an upper end is flush with the upper end of the above-mentioned separation tank, a side on the lead pipe side is joined to the opposite side with respect to the lead pipe of the above-mentioned casing A, and other sides are joined to the inner walls of the above-mentioned separation tank; a hollow pipe vertically projecting through and upstandingly joined to the bottom of the above-mentioned casing B, its upper surface being externally screw threaded, the water separated by the above-mentioned separation tank flowing through the pipe; a liquid level adjustment pipe internally screw threaded to be threadedly engaged with threads at the upper external surface of the above-mentioned hollow pipe; a discharging port provided at a side of the above-mentioned casing A to discharge the floating oil in the above-mentioned casing A; a discharging hose connected with the above-mentioned discharging port to lead the floating oil in the above-mentioned casing A to a collecting container; an outflow port provided at a side of the above-mentioned casing B so as to cause water received from the above-mentioned hollow pipe to flow out; and an outflow hose connected with the above-mentioned outflow port so as to lead the above-mentioned separated water to an arbitrary part.

The inflow rate of the oil to the above-mentioned casing A can be adjusted by the liquid-level adjustment pipe, and oil/water separation can be performed effectively. Only the pump supplies the power for operation, a smaller amount of energy for processing is sufficient. Since the separation is carried out mechanically and chemicals are not used, the separated water is collected as it is and can be reused.

Further, the floating oil collecting system preferably comprises, in addition to the above-mentioned separation tank, a second separation tank provided below bottom sides of an outflow port and a discharging port of the above-mentioned separation tank; a discharge pipe connected to the discharging port of the above-mentioned casing A provided above the above-mentioned second separation tank so as to cause the floating oil to flow into the above-mentioned second separation tank; a casing C provided in the above-mentioned second separation tank in which a top is open, an upper end on the above-mentioned discharge pipe side is located below an upper end of the above-mentioned second separation tank, upper ends of other sides are flush with the upper end of the above-mentioned second separation tank, left and right sides viewed from the discharge pipe side are joined to inner walls of the above-mentioned second separation tank, and the floating oil floating in the above-mentioned second separation tank is discharged from the above-mentioned discharge pipe side; a casing D in which a top is open, an upper end is flush with the upper end of the above-mentioned second separation tank, a side of the above-mentioned discharge pipe is joined to the opposite side with respect to the above-mentioned discharge pipe of the above-mentioned casing C, and other sides are joined to the inner walls of the above-mentioned second separation tank; an outflow pipe arranged above the above-mentioned casing D to cause water flowing out of the casing B to flow into the casing D; a hollow pipe vertically projecting through and upstandingly joined to the bottom of the above-mentioned casing D, its upper surface being externally screw threaded, the water separated by the above-mentioned second separation tank flowing through the pipe; a liquid level adjustment pipe internally screw threaded to be threadedly engaged with threads at the upper external surface of the above-mentioned hollow pipe; a discharging port provided at a side of the above-mentioned casing C to discharge the floating oil in the above-mentioned casing C; a discharging hose connected with the above-mentioned discharging port to lead the floating oil in the above-mentioned casing C to a collecting container; an outflow port provided at a side of the above-mentioned casing D so as to cause water received from the above-mentioned hollow pipe to flow out; and an outflow hose connected with the above-mentioned outflow port so as to lead the above-mentioned separated water to an arbitrary part.

Since two separation tanks are provided to perform the oil/water separation twice, it is possible to effectively collect oil from the oil/water mixture containing a lot of air bubbles, while the oil/water separation performed only once by one separation tank is difficult to provide efficient separation.

Effects of the Invention

Further, an upper surface near the discharging port of the discharge pipe connected to the discharging port of the casing A of said separation tank is preferably provided with an opening for exhausting gas.

Since the upper surface near the discharging port of the discharge pipe is provided with the opening for exhausting gas, the oil/water separation can be performed more effectively by not causing the air generated in the first separation tank to flow into the second separation tank.

Effects of the Invention

According to the present invention, it is possible to obtain the liquid-level following type suction apparatus which holds the suction inlet in the optimal position under the liquid level without adjusting. It is also possible to obtain the floating oil collecting system provided with the above-mentioned liquid-level following type suction apparatus in which floating oil containing a considerably reduced amount of water can be collected quickly.

BRIEF DESCRIPTION OF THE DRAWINGS

FIG. 3 are views showing a holding member which constitutes the apparatus of Example 1, where FIG. 3(a) is a perspective view, FIG. 3(b) is a plan view, and FIG. 3(c) is a front view.

FIG. 4(a) is a perspective view and FIG. 4(b) is a plan view.

FIGS. 7(a) to 7(b) are views showing the liquid-level following type suction apparatus in Example 2 in accordance with the present invention, where FIG. 7(a) is a perspective view and FIG. 7(b) is a front view.

FIG. 8(a) is a perspective view, FIG. 8(b) is a plan view, and FIG. 8(c) is a front view.

FIG. 9(a) is a perspective view and FIG. 9(b) is a front view.

FIG. 11(a) is a perspective view, FIG. 11(b) is a plan view, FIG. 11(c) is a front view, and FIG. 11(d) is a side view.

FIG. 12(a) is a plan view and FIG. 12(b) is a front view.

FIG. 14(a) is a perspective view and FIG. 14(b) is a front view.

BEST MODE FOR CARRYING OUT THE INVENTION

Hereinafter, a preferred embodiment of the present invention will be described for every Example.

Example 1

Figure 1:
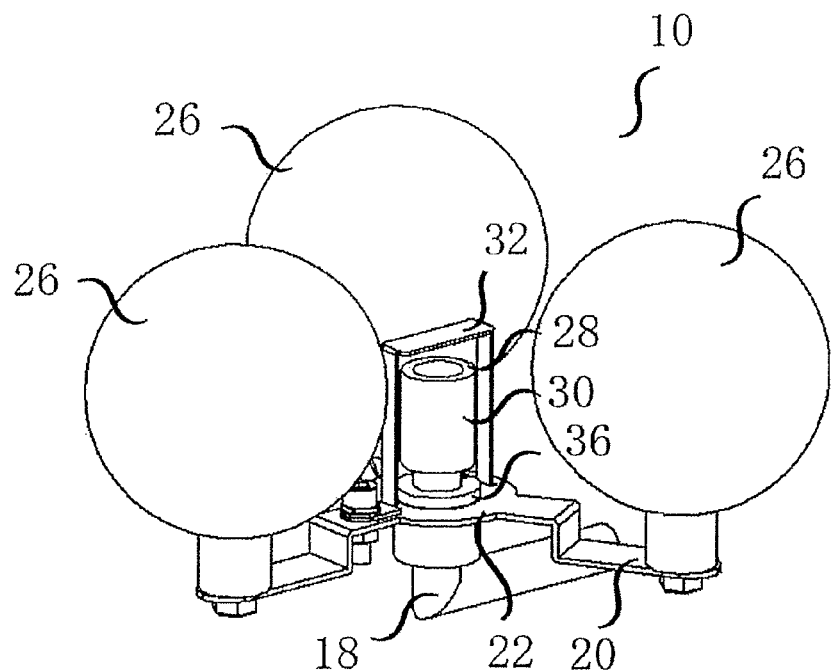
FIG. 1 is a perspective view showing a liquid-level following type suction apparatus of Example 1 in accordance with the present invention.
Figure 2:
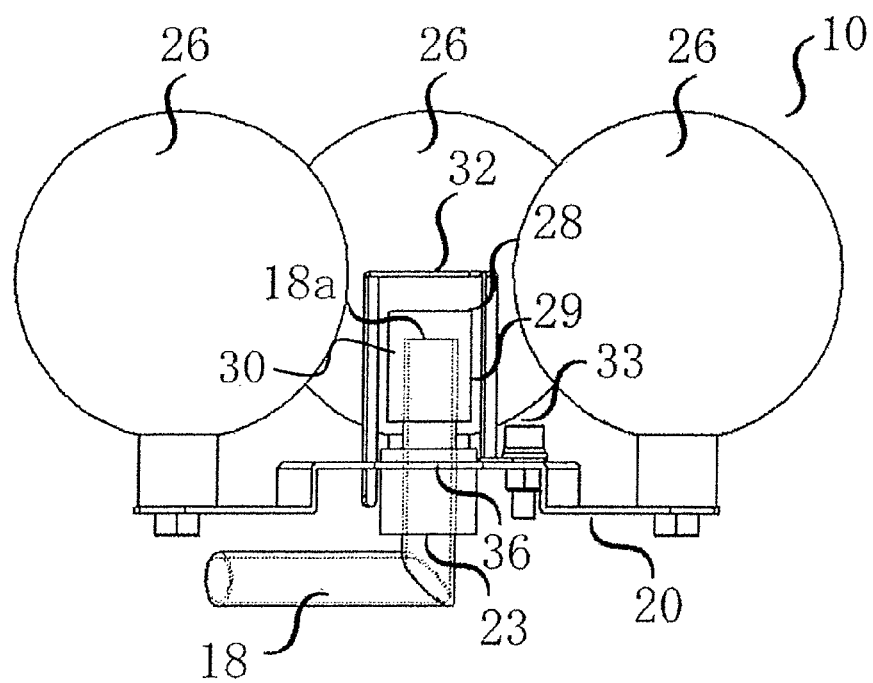
FIG. 2 is a front view of the apparatus.
Figure 4A:
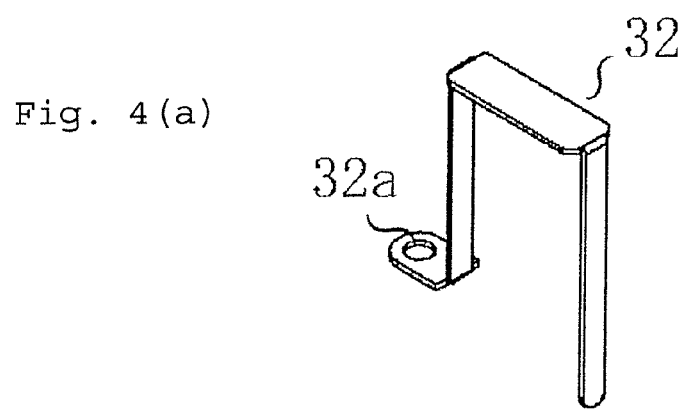
FIGS. 4(a) to 4(b) are views showing a stopper which constitutes the apparatus of Example 1, where
Figure 4B:
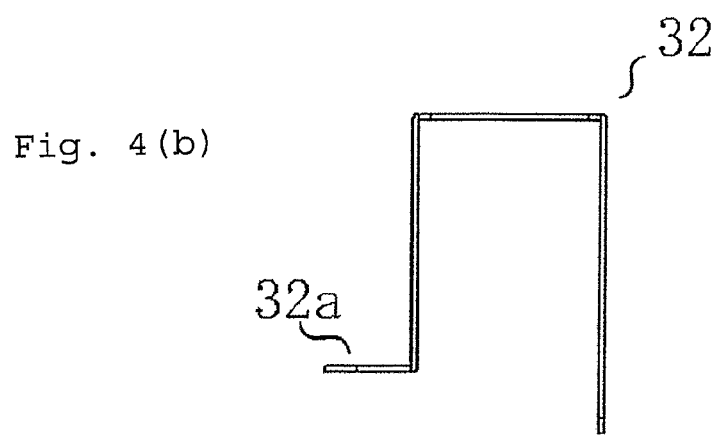

FIG. 1 is a perspective view showing a liquid-level following type suction apparatus 10 of Example 1; FIG. 2 is a front view of the apparatus; FIG. 3 are views showing a holding member 22 which constitutes the apparatus of Example 1, where FIG. 3(a) is a perspective view from above of the member, FIG. 3(b) is a plan view, and FIG. 3(c) is a front view; FIGS. 4(a) to 4(b) are views showing a stopper 32 which constitutes the apparatus of Example 1, where FIG. 4(a) is a perspective view and FIG. 4(b) is a rear view.

As shown in these figures, the liquid-level following type suction apparatus 10 is provided with an intake pipe 18, the holding member 22 fixed to the intake pipe 18, three float bodies 26 respectively attached to three extension portions 20 of the above-mentioned holding member 22, and an adjustment pipe 30 loosely fitted to the intake pipe 18 so as to be movable up and down.

As shown in FIG. 2, the intake pipe 18 is not rounded but bent to be at right angles and L-shaped, one end is an inlet side end 18a which opens upwardly, and a suction hose 16 is connected with the other end of the inlet side end 18a in the operation of the liquid-level following type suction apparatus 10, so as to communicate with an inlet port of a pump.

Using the L-shaped intake pipe 18 reduces the overall height of the liquid-level following type suction apparatus as compared with the case where a curved intake pipe which is bent smoothly and greatly is used, and therefore it is convenient to suck the oil/water mixture whose liquid level 25 is low.

As shown in FIG. 3, the holding member 22 is provided with a central hole 21a through which the intake pipe 18 is inserted, and the three extension portions 20 which extend radially about the central hole 21a are also provided. The three spherical float bodies 26 are respectively held at the three extension portions 20. Reference sign 21b indicates an attachment hole to which the stopper 32 (to be set forth later) is attached, and reference sign 21c shows attachment holes to which the float bodies 26 are respectively attached.

One end side of the cylindrical holder 23 is fixed to an undersurface in the center of the holding member 22. The central hole 21a of the holding member 22 and a through hole of the cylindrical holder 23 are aligned. The intake pipe 18 is inserted through the central hole 21a of the holding member 22 and the cylindrical holder 23 (not shown in FIGS. 1 to 3), and is fixed to the holding member 22 by tightening a wing bolt 24 which is screwed into an attachment hole 23a bored at a side of the cylindrical holder 23 (see FIGS. 9(a) to 9(b)).

As shown in FIG. 2, the float body 26 is attached to the extension portion 20 of the holding member 22, and as shown in FIGS. 6(a) to 6(d), causes the inlet side end 18a of the intake pipe 18 to closely follow the liquid level 25 in the oil/water mixture 46 in a storage tank 44 (to be set forth later) in the operation of the liquid-level following type suction apparatus 10. A conventional float is used as the float body 26, but not limited to the sphere shape.

The adjustment pipe 30 has a larger inner diameter than an outer diameter of the intake pipe 18 and is in the inlet side end 18a so as to be movable up and down. For example, the inner diameter of the adjustment pipe 30 is set to 12.7 mm, while the outer diameter of the intake pipe 18 is 12 mm.

Since the adjustment pipe 30 is loosely fitted to the end of the intake pipe 18 so as to be movable up and down, a clearance 34 is formed between the adjustment pipe 30 and the intake pipe 18, as shown in FIGS. 6(a) to 6(d). The clearance 34 serves as a liquid circulation passage in the operation of the liquid-level following type suction apparatus 10.

The adjustment pipe 30 is a tubular member formed of a resin with a specific gravity of greater than one (1). As examples of the resin having a specific gravity of greater than one (1), there may be mentioned "POLYPENCO PET" (trade name) having a specific gravity of 1.39 to 1.44, and "POLYPENCO PEEK" (trade name) having a specific gravity of 1.32 to 1.51. It should be noted that "POLYPENCO" is a registered trademark.

Figure 6A:
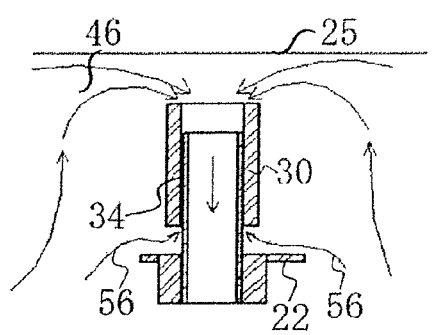
FIGS. 6(a) to 6(d) are charts for explaining operation in Example 1.
Figure 6B:
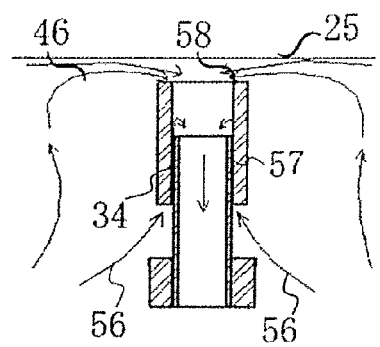
Figure 6C:
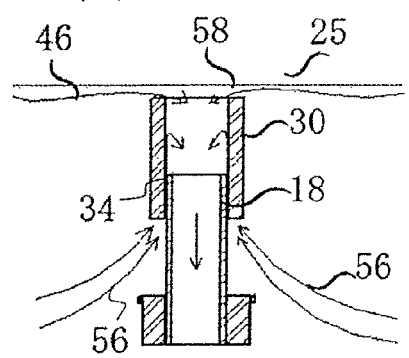

Since the adjustment pipe 30 is formed of the resin having a specific gravity of greater than one (1), an upper end opening edge 28 of the adjustment pipe 30 can be held in a more proper position with respect to the liquid level 25 when the liquid-level following type suction apparatus 10 is in operation (See FIG. 6(c)).

A strip-like stopper 32 which prevents escape of the adjustment pipe 30 is provided above the adjustment pipe 30. Both ends of the stopper 32 are formed and bent mutually opposite directions as shown in FIGS. 4(a) to 4(b). The attachment hole 32a for attaching the stopper 32 to the holding member 22 is provided at one end.

As shown in FIGS. 2 and 3, as for the stopper 32, one end is fixed by an attaching screw 33 inserted into the attachment hole 21b of the holding member 22, and the other end is arranged to face an outer end face of the adjustment pipe 30 at a predetermined distance. The stopper 32 prevents the adjustment pipe 30 from escaping from the intake pipe 18 and missing.

A washer 36 is provided and positioned to face a bottom end face of the adjustment pipe 30 of the holding member 22. The washer 36 is for placing thereon the adjustment pipe 30 so as not to shut the clearance 34 exposed at a bottom side of the adjustment pipe 30, i.e. the clearance 34 (see FIGS. 6(a) to 6(d)) between the intake pipe 18 and the adjustment pipe 30, when the liquid-level following type suction apparatus 10 is not in operation (i.e., when it is in the position shown in FIG. 2).

A torsion washer is used as the washer 36, for example. Provision of the washer 36 allows a bottom side of the adjustment pipe 30 to be raised (away) from the upper surface of the holding member 22 as shown in FIG. 2, and the adjustment pipe 30 can be smoothly moved to a proper position immediately after driving the pump in the operation of the liquid-level following type suction apparatus 10.

Figure 5:
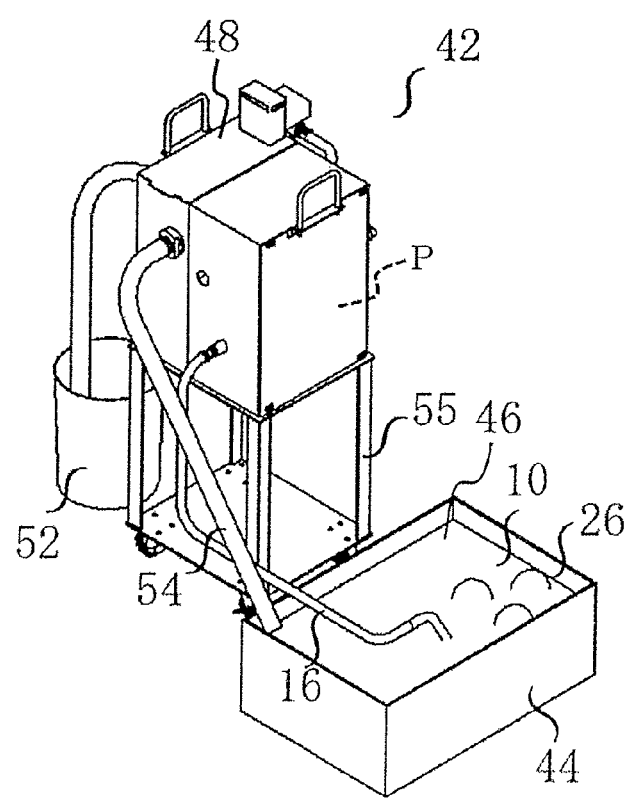
FIG. 5 is a perspective view showing a situation where the liquid-level following type suction apparatus in accordance with the present invention is used for a floating oil collecting system.

FIG. 5 is a perspective view showing a situation where the liquid-level following type suction apparatus 10 is used for a floating oil collecting system 42.

The floating oil collecting system 42 is provided with a separation tank 48 which separates the oil/water mixture 46 in the storage tanks 44, such as a machine-tool coolant tank and a cleaning solvent tank, into oil and water, a pump P (pump P is housed in a case but not particularly shown) which sucks up the oil/water mixture 46 from the storage tank 44 using the liquid-level following type suction apparatus 10 and the suction hose 16, and supplies it into the separation tank 48, and a collecting container 52 which collects the floating oil separated by the separation tank 48.

The suction hose 16 which communicates with the pump is connected to the intake pipe 18, and the liquid-level following type suction apparatus 10 is installed in the storage tank 44.

The above-mentioned pump is provided inside the case on a frame 55 on which the separation tank 48 is mounted, the suction hose 16 is connected with its inlet port, and an inflow pipe (not shown) for supplying the liquid discharged from the suction hose 16 to the separation tank 48 is connected with a discharge outlet.

The intake pipe 18 is held by the three spherical float bodies 26 and surfaces to the liquid level in the storage tank 44, and the inlet side end 18a opens near the liquid level in the storage tank 44 so as to suck the uppermost liquid (floating oil) in the storage tank 44 at all times.

Figure 6D:
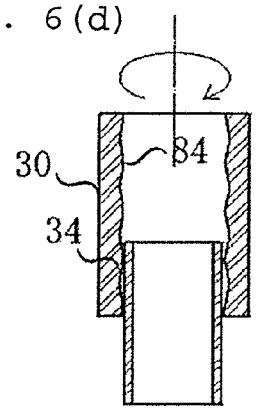

FIGS. 6(a) to 6(d) are charts for explaining operation in a situation where the pump of the liquid-level following type suction apparatus 42 is driven after installing the liquid-level following type suction apparatus 10 of Example 1 in the storage tank 44; FIG. 6(a) is a chart showing a state immediately after driving the pump; FIG. 6(b) is a chart showing a subsequent state; FIG. 6(c) is a chart showing a situation where stable suction is carried out by the pump; FIG. 6(d) is a chart for explaining operation in the case where a spiral recess is provided for the inner periphery of the adjustment pipe 30.

As the drive of the pump is started, the state shown in FIG. 6(a) instantly moves to the state shown in FIG. 6(c) through the state shown in FIG. 6(b). In other words, the bottom side of the adjustment pipe 30 is raised above the upper surface of the holding member 22 by the washer 36 (not shown) in the state shown in FIG. 6(a).

Thus, as the driven pump generates suction force from the intake pipe 18, the oil/water mixture 46 in the storage tank 44 is drawn into the intake pipe 18 through an upper end side of the adjustment pipe 30 at the beginning as shown in FIG. 6(a). At the same time, liquid flow shown by an arrow 56 takes place from the bottom side of the adjustment pipe 30 towards the clearance 34 between the adjustment pipe 30 and the intake pipe 18. This liquid flow rises within the clearance 34 and is sucked into the intake pipe 18 as shown by an arrow 57.

While the oil/water mixture 46 is rising in the clearance 34, the state is such that the adjustment pipe 30 in the oil/water mixture 46 is raised due to viscosity of the oil/water mixture 46 etc., as shown in FIG. 6(c). In this state, the upper end side of the adjustment pipe 30 is located near the liquid level 25, and sucks the floating oil of the oil/water mixture 46 effectively.

The adjustment pipe 30 is pushed up by the viscosity of the oil/water mixture 46 hitting the bottom side of the adjustment pipe 30 and flowing up and the oil/water mixture 46 flowing up inside the above-mentioned clearance 34. However, during operation of the pump, the upper end side of the adjustment pipe 30 does not project from the liquid level 25 but is located underneath the liquid level 25. This is because the downward force by the weight of the oil/water mixture 46 which flows at the upper end side of the adjustment pipe 30 as shown by arrow 58, the weight of the adjustment pipe 30 having a specific gravity of greater than one (1), etc., is balanced with respect to lifting force by the viscosity of the oil/water mixture 46 flowing upwards within the clearance 34 and along the outer periphery of the adjustment pipe 30 and the buoyancy applied to the adjustment pipe 30.

In addition, as shown in FIG. 6(d), in the case where a spiral recess 84 is formed at the inner periphery of the adjustment pipe 30, rotational force is applied to the adjustment pipe 30 by the oil/water mixture 46 which flows upwards in the clearance 34. As the adjustment pipe 30 rotates, a whirlpool arises in the liquid which flows from the upper end side of the adjustment pipe 30 into the intake pipe 18, thus having the effect that a discharge efficiency of the oil/water mixture 46 is raised.

Since the adjustment pipe 30 is provided at the inlet side end 18a of the intake pipe 18 so as to be movable up and down, the buoyancy with respect to the float body 26 may fluctuate due to variations with time in the ingredient of the oil/water mixture 46, variations with time in the depth of the floating oil near the liquid level 25, etc. If this is the case, the inlet opening of the adjustment pipe 30 is always automatically held in a proper position with respect to the liquid level 25. For this reason, the floating oil can efficiently be collected, and an amount of water contained in the collected floating oil can be decreased considerably.

Example 2

Figure 7A:
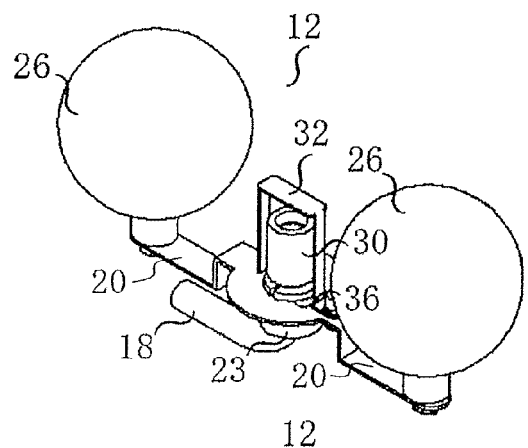
Figure 8A:
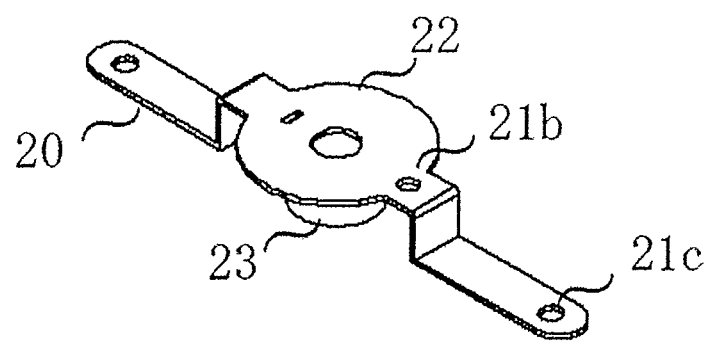
FIGS. 8(a) to 8(c) are views showing the holding member which constitutes the apparatus in Example 2, where
Figure 8B:
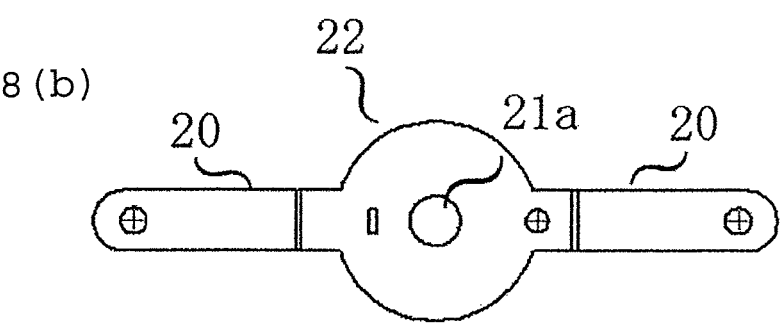
Figure 8C:
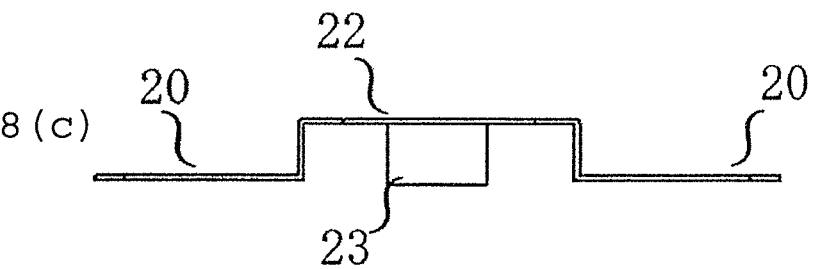

FIGS. 7(a) to 7(b) are views showing a liquid-level following type suction apparatus 12 in Example 2, where FIG. 7(a) is a perspective view and FIG. 7(b) is a front view. FIGS. 8(a) to 8(c) are views showing the holding member which constitutes the apparatus in Example 2, where FIG. 8(a) is a perspective view, FIG. 8(b) is a plan view, and FIG. 8(c) is a front view. In these figures, like parts are given the same reference signs as in FIGS. 1 to 4(b), and the description of these parts will not be repeated herein.

The liquid-level following type suction apparatus 12 is an example in which two float bodies 26 are used, and has the same structure as the liquid-level following type suction apparatus 10 except that two extension portions 20 of the holding member 22 are provided, thus obtaining the same effect. Since the whole structure of the liquid-level following type suction apparatus 12 is compact as compared with the liquid-level following type suction apparatus 10, it is suitably used for the storage tank 44 whose opening is small.

Example 3

Figure 9A:
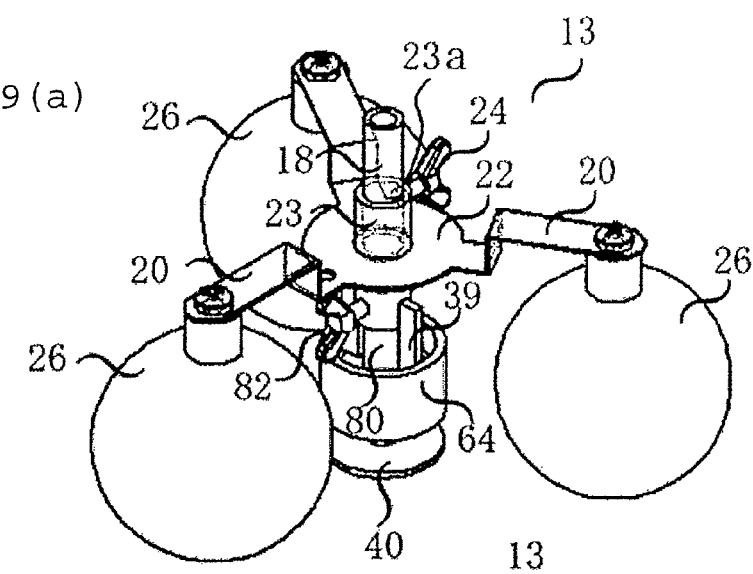
FIGS. 9(a) to 9(b) are views showing the liquid-level following type suction apparatus in Example 3 in accordance with the present invention, where
Figure 9B:
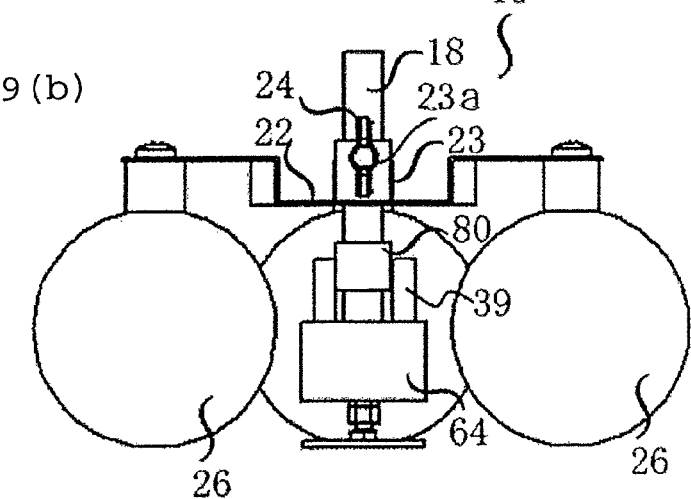
Figure 10:
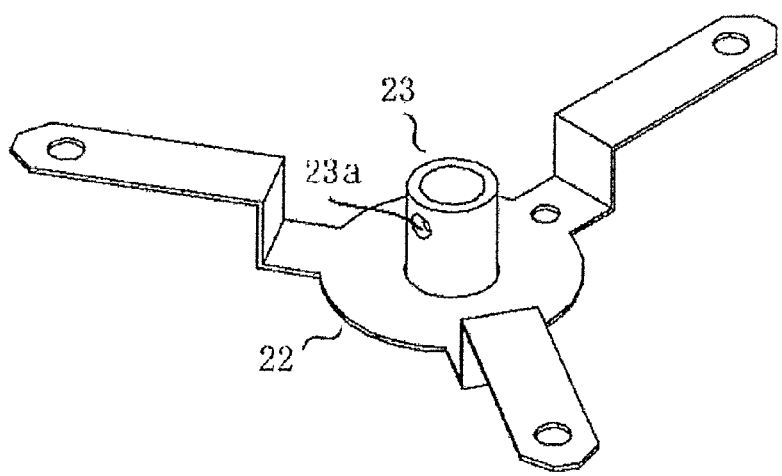
FIG. 10 is a perspective view showing the holding member which constitutes the apparatus in Example 3.
Figure 11A:
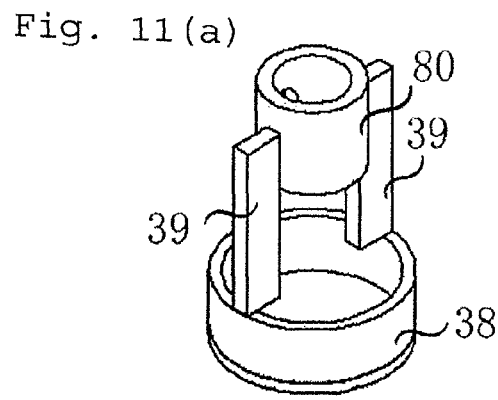
FIGS. 11(a) to 11(d) are views showing another component which constitutes the apparatus in Example 3, where
Figure 11B:
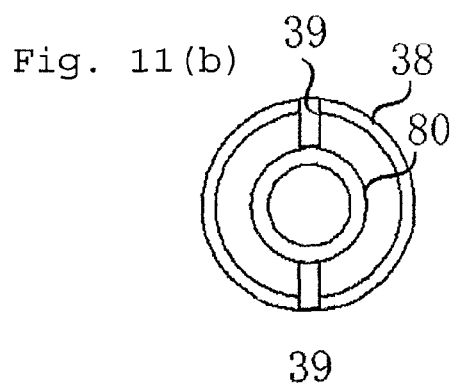
Figure 11C:
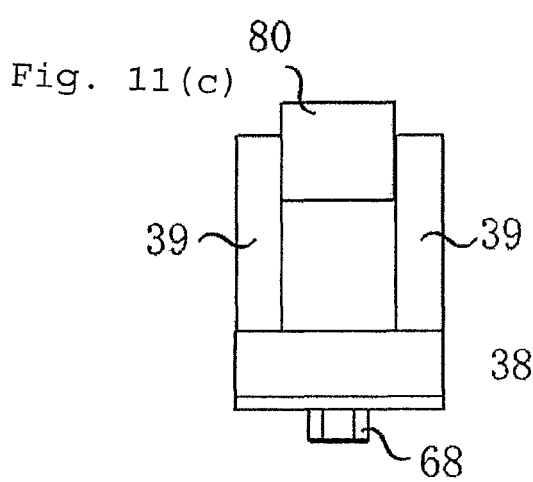
Figure 11D:
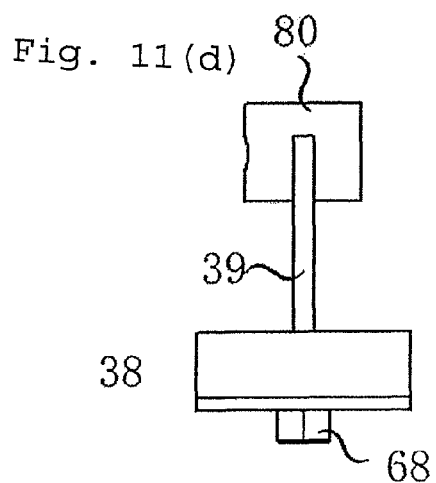
Figure 12A:
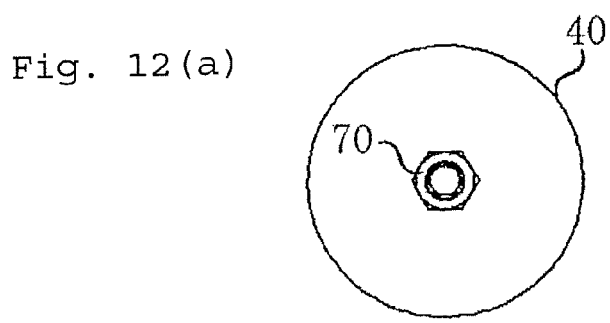
FIGS. 12(a) to 12(b) are views showing a stopper which constitutes the apparatus in Example 3, where
Figure 12B:
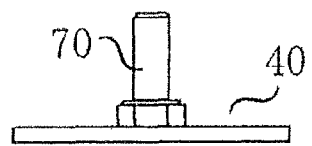

FIGS. 9(a) to 9(b) are views showing a liquid-level following type suction apparatus 13 in Example 3, where FIG. 9(a) is a perspective view and FIG. 9(b) is a front view; FIG. 10 is a perspective view showing the holding member which constitutes the apparatus in Example 3; FIGS. 11(a) to 11(d) are views showing another component which constitutes the apparatus in Example 3, where FIG. 11(a) is a perspective view, FIG. 11(b) is a plan view, FIG. 11(c) is a front view, and FIG. 11(d) is a side view; FIGS. 12(a) to 12(b) are views showing a stopper which constitutes the apparatus in Example 3, where FIG. 12(a) is a plan view and FIG. 12(b) is a front view. In these figures, like parts are given the same reference signs as in FIGS. 1 to 4(b), and the description of these parts will not be repeated herein.

The liquid-level following type suction apparatus 13 is basically different from the above-mentioned liquid-level following type suction apparatus 10 in that the inlet side end of the intake pipe 18 is arranged to face downwardly with respect to the liquid level 25.

In other words, the liquid-level following type suction apparatus 13 is provided with the intake pipe 18 arranged to be upstanding, its upper end being connected with the suction hose which communicates with the inlet port of the pump, the holding member 22 engaged with and fixed to the intake pipe 18 and having the extension portion 20 which extends outwardly, the float body 26 which is attached to the extension portion 20 of the holding member 22 and causes the bottom part of the intake pipe 18 to closely follow the liquid level 25 in the liquid, a pan 38 spaced from the bottom part of the intake pipe 18 by a suitable distance, and an adjustment pipe 64 which is loosely engaged with the outer periphery of the pan 38 so as to be movable up and down, its upper end opening edge acting as the inlet opening.

As shown in FIG. 10, one end side of the cylindrical holder 23 is fixed to the upper surface in the center of the holding member 22. The intake pipe 18 is inserted into the central hole of the holding member 22 and the cylindrical holder 23 and is fixed to the holding member 22 by tightening the wing bolt 24 which is screwed into the attachment hole 23a bored at the side of the cylindrical holder 23.

A cylindrical holder 80 for holding the pan 38 is loosely fitted to the intake pipe 18. The cylindrical holder 80 is fixed to the intake pipe 18 by tightening the wing bolt 82 which is screwed into an attachment hole 66 bored on a side of the holder (see FIGS. 9(a), 9(b), 14(a), and 14(b)).

Figure 13:
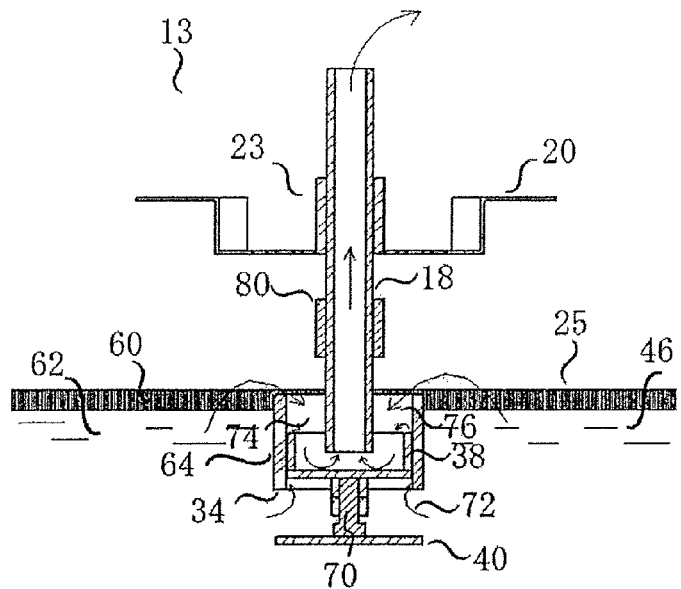
FIG. 13 is a diagram for explaining operation in Example 3.

The pan 38 is connected with the cylindrical holder 80 through two connection members 39, as shown in FIGS. 11(a) to 11(d). A nut 68 is provided in the center of the bottom of the pan 38. As shown in FIG. 13, the pan 38 is formed to be cylindrical and to have the bottom and is arranged to face the bottom part of the intake pipe 18 and to surround the bottom part of the intake pipe 18 with its rim.

A disc-shaped planar stopper 40 is arranged to face and be spaced from the bottom of the pan 38 by a predetermined distance and prevent the adjustment pipe 64 from escaping. As shown in FIGS. 12(a) to 12(b), a bolt 70 is fixed to the central part of the upper surface of the stopper 40. By screwing the bolt 70 into the nut 68 provided on the bottom of the pan 38, the stopper 40 is connected with the bottom of the pan 38.

The adjustment pipe 64 is a tubular member formed of a resin with a specific gravity of greater than one (1) and has an inner diameter larger than the outer diameter of the pan 38.

FIG. 13 is a diagram for explaining operation of the liquid-level following type suction apparatus 13 of Example 3. FIG. 13 shows a situation where the pump of the floating oil collecting system 42 is driven after installing the liquid-level following type suction apparatus 13 in the storage tank 44.

As the drive of the pump is started, by the suction force from the intake pipe 18 the oil/water mixture 46 in the storage tank 44 is drawn from the upper end side of the pan 38 into the intake pipe 18, since the adjustment pipe 64 is disposed on the disc-shaped planar stopper 40 at the beginning. At the same time, the oil/water mixture 46 flows upwards through the clearance 34 between the adjustment pipe 64 and the pan 38 and is drawn into the intake pipe 18 as shown by arrows 72 and 74.

While the oil/water mixture 46 is flowing upwards through the clearance 34, its viscosity etc. raises the adjustment pipe 64 in the oil/water mixture 46, leading to the state as shown in FIG. 13. In this state, the upper end side of the adjustment pipe 64 is located near the liquid level 25 and effectively sucks the floating oil 60 of the oil/water mixture 46.

Although the adjustment pipe 64 is pushed up by the viscosity of the oil/water mixture 46 flowing through the bottom end side of the adjustment pipe 64 and the clearance 34, its upper end side does not surface from the liquid level 25 but is always located underneath the liquid level 25. This is because, as with the liquid-level following type suction apparatus 10, the weight of the oil/water mixture 46 which flows at the upper end side of the adjustment pipe 64 as shown by arrow 76 and the weight of the adjustment pipe 64 having a specific gravity of greater than one (1), etc., are balanced with respect to the lifting force by the viscosity of the water mixture 46 flowing upwards through the bottom end side of the adjustment pipe 64 and the clearance 34.

Since the liquid-level following type suction apparatus 13 provides operational effects similar to those in Example 1 and the opening of the bottom part of the intake pipe 18 is installed to face downwardly, the liquid can be sucked even if the liquid level 25 is low.

Example 4

Figure 14A:
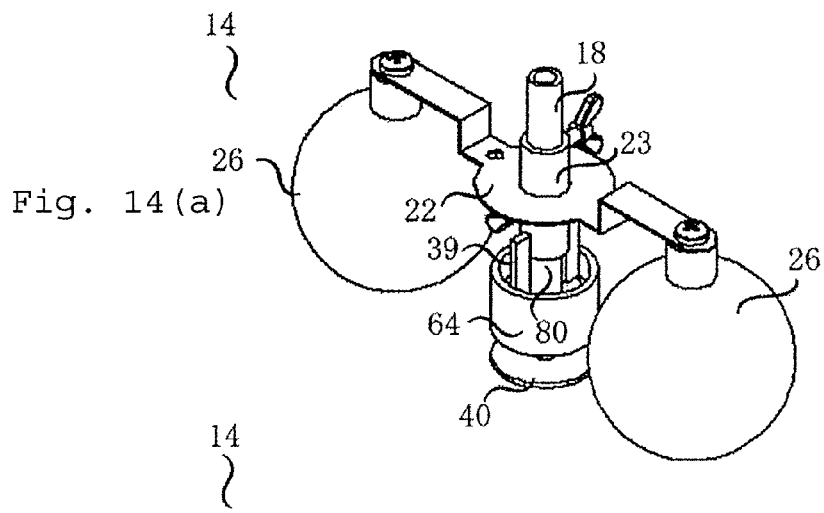
FIGS. 14(a) to 14(b) are views showing the liquid-level following type suction apparatus in Example 4 in accordance with the present invention, where
Figure 14B:
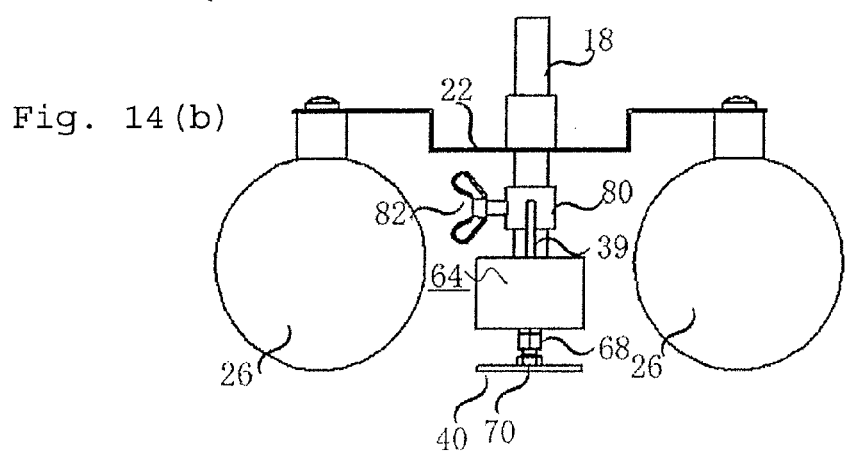

FIGS. 14(a) to 14(b) are views showing a liquid-level following type suction apparatus 14 in Example 4, where FIG. 14(a) is a perspective view and FIG. 14(b) is a front view. In FIGS. 14(a) to 14(b), like parts are given the same reference signs as in FIGS. 1 to 4, and the description of these parts will not be repeated herein.

The liquid-level following type suction apparatus 14 is an example in which two float bodies 26 are used, and has the same structure as the liquid-level following type suction apparatus 13 except that two extension portions 20 of the holding member 22 are provided, thus obtaining the same effect. Since the whole structure of the liquid-level following type suction apparatus 14 is compact as compared with the liquid-level following type suction apparatus 13, it is suitably used for the storage tank 44 whose opening is small.

Example 5

Figure 15:
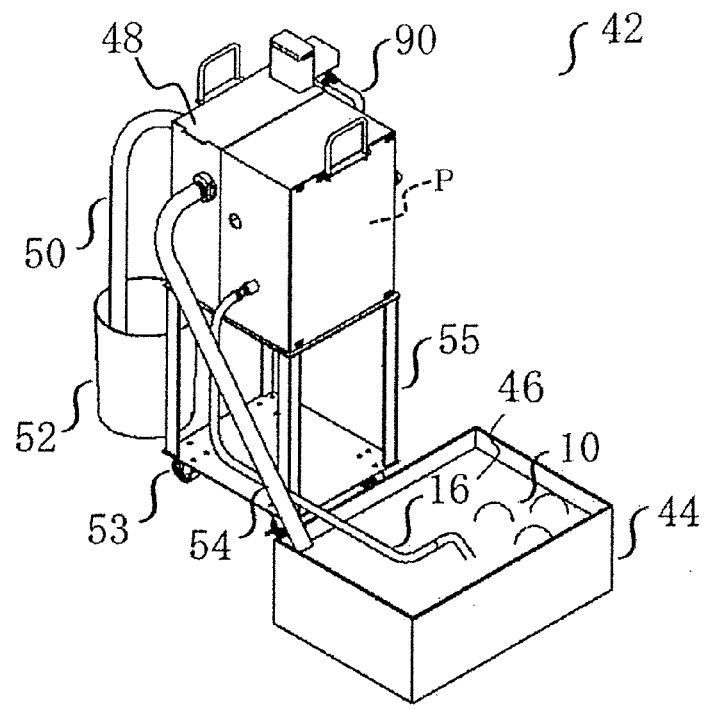
FIG. 15 is a perspective view showing an embodiment of the floating oil collecting system in Example 5 in accordance with the present invention.
Figure 16:
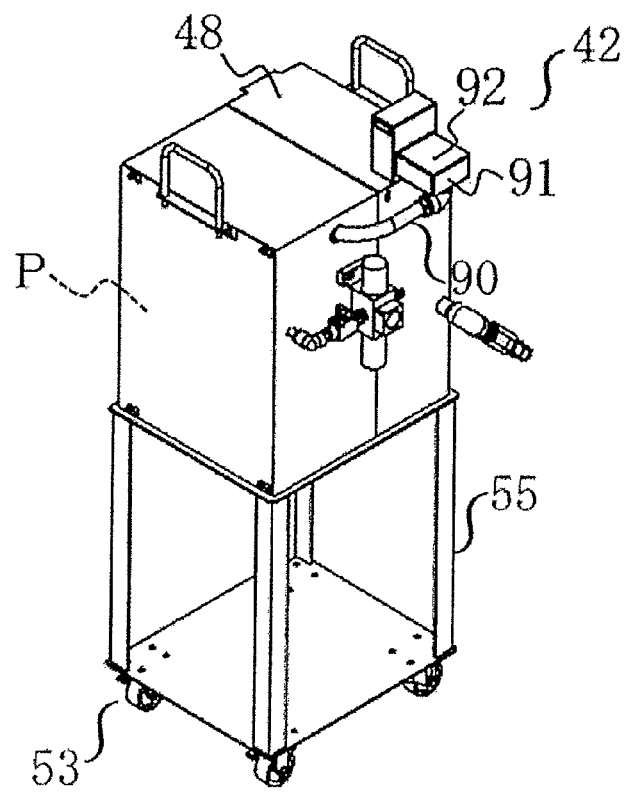
FIG. 16 is a perspective view showing components in Example 5.
Figure 17:
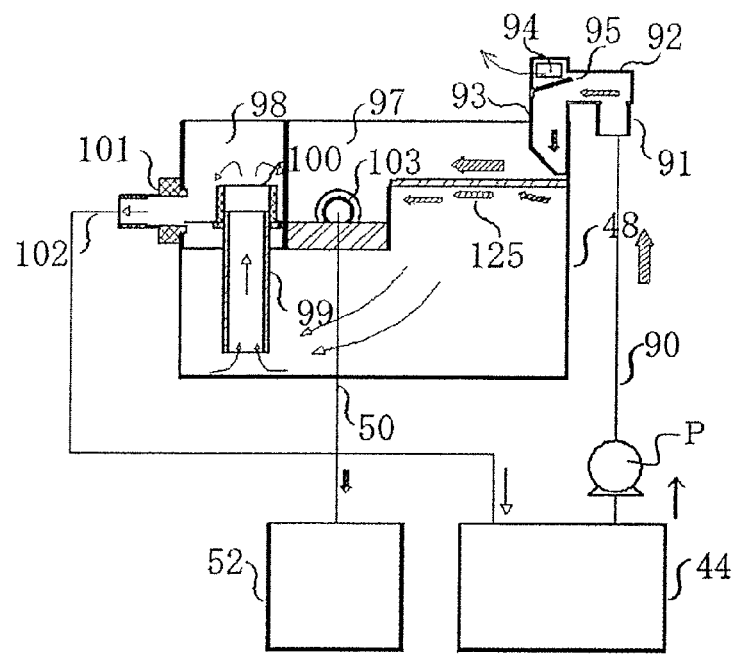
FIG. 17 is a schematic diagram of the floating oil collecting system of the present invention.

FIG. 15 is a perspective view showing an embodiment of the floating oil collecting system in Example 5; FIG. 16 is a perspective view showing components in Example 5; FIG. 17 is a schematic diagram of the floating oil collecting system of the present invention. As shown in these figures, the floating oil collecting system 42 is provided with a separation tank 48 which separates the oil/water mixture 46 in the storage tanks 30, such as a machine-tool coolant tank and a cleaning solvent tank, into oil and water, a pump P which sucks up the oil/water mixture 46 from the storage tank 44 using the liquid-level following type suction apparatus 10 and the suction hose 16, and supplies it into the separation tank 48 through an inflow hose 90 and the inflow pipe 91, and a collecting container 52 which collects the floating oil separated by the separation tank 48 through a discharging hose 50. The collected oil is suitably disposed of as waste fluid. The remaining liquid (water) from which oil has been removed is returned from the separation tank to the storage tank and reused.

As shown in FIG. 17, the oil/water mixture flowed into the inflow pipe 91 through the inflow hose 90 from the pump P reduces its speed and is led to a lead pipe 93 through an opposite side of the interconnecting tube 92. The lead pipe 93 is fixed to an inner wall of the separation tank at an upper part of the separation tank 48 so as to be vertical. An interconnecting tube 92 is joined with a side of the lead pipe 93 so that it may outwardly project outside the separation tank 48. An inflow pipe 91 is joined to the undersurface of the interconnecting tube 92, and connected to the pump (not shown) through an inflow hose 90. The inflow pipe 91, an interconnecting tube 92, and the lead pipe 93 are united with welding etc. Further, the lead pipe 93 is arranged so that its attachment position to the separation tank 48 may be adjusted vertically.

In addition, a method of fixing the above-mentioned lead pipe to the inner wall of the above-mentioned separation tank 48 is such that attaching and detaching are easily carried out by the nut and bolt method and a plurality of vertical attachment positions are selectably arranged by providing a plurality of attachment holes in the vertical direction.

As shown in FIG. 17, an opening 94 for deaeration is formed in the lead pipe 93 at its upper part, and the air in the oil/water mixture flows out of the upper opening 94. A whirl stop 95 which is inclined upwardly to the interconnecting tube 92 is provided in the lead pipe 93, and there is a clearance between a tip of the whirl stop 95 and the wall of the interconnecting tube. This whirl stop 95 prevents the oil/water mixture from spreading out of the opening 94. A cross-sectional area of the lower part of the lead pipe 93 is gradually reduced so that the oil/water mixture is collected in a small range to flow into the separation tank 48.

As shown in FIG. 17, a casing A97 and a casing B98 are included in the upper part of the separation tank 48.

This casing A97 is provided in the above-mentioned separation tank 48, a top is open, an upper end of a side on the above-mentioned lead pipe 93 side is located below the upper end of the above-mentioned separation tank, an upper end of the other side is flush with an upper end of the above-mentioned separation tank 48, and left and right sides viewed from the lead pipe 93 side are joined to the inner walls of the separation tank, so as to receive the floating oil floating in the above-mentioned separation tank from the above-mentioned lead pipe side end face.

As for the casing B98, a top is open, an upper end is flush with the upper end of the above-mentioned separation tank 48, a side on the lead pipe 93 side is joined to the opposite side with respect to the lead pipe 93 of the above-mentioned casing A, and other sides are joined to the inner walls of the above-mentioned separation tank.

The oil/water mixture flows from the lead pipe 93 into the separation tank 48. It is separated into oil and water by the difference in specific gravity, and the separated oil surfaces to the liquid level.

As shown in FIG. 17, water flows out of the separation tank 48 through the outflow port of the casing B, after separating oil.

The casing A97 is formed to have an open top. The oil surfaced to the liquid level in the separation tank 48 flows into the casing A97 as shown by arrow 125 in the drawing. The oil stored in the casing A97 is led from the oil outlet 103 provided on a side of the casing A97 to the collecting container 52 through a discharging hose 50.

The casing B98 is formed to have an open top. The casing B98 adjoins the casing A97.

As shown in FIG. 17, water flows from the separation tank 48 (under the casing A97) into the casing B98 through a casing B hollow pipe 99 which stands vertically, projects through the bottom of the casing B98, and is joined to the bottom. A water-recycling outlet 101 is provided on a side (of the casing B98) opposite the casing A97 and water returns to the storage tank through a water-recycling hose 102. An upper part of the casing B hollow pipe 99 is externally screw threaded, and the liquid level adjustment pipe 100 side is internally screw threaded. By screwing the liquid level adjustment pipe 100, the liquid level in the casing B98 can be easily adjusted.

In other words, a hollow pipe 99 vertically projecting through and upstandingly joined to the bottom of the above-mentioned casing B98 in which its upper surface is externally screw threaded and the water separated by the above-mentioned separation tank flows through the pipe, and a liquid level adjustment pipe 100 internally screw threaded to be threadedly engaged with threads at the upper external surface of the above-mentioned hollow pipe 99 are provided to allow the liquid level in the casing B98 to be adjusted.

The separation tank 48 and the casing B98 form one fluid space through the casing B hollow pipe 99 and the liquid level adjustment pipe 100. Therefore, a height of the liquid level in the separation tank 48 and a height of the liquid level of the casing B98 move so that they may always be equal to each other. The liquid level in the separation tank 48 can be adjusted by adjusting the liquid level in the casing B98 with the liquid level adjustment pipe 100 in the casing B98. Oil surfaces to the liquid level in the separation tank 48 and flows into the casing A97 over a side wall bordering the casing A97. Since a thickness of an oil film changes with differences in the type of oil, it is possible to provide the optimal liquid level according to the thickness of the oil film by adjusting the liquid level with respect to an upper end of the side wall.

However, in the case where the liquid level in the separation tank 48 is not stabilized but shaking like a wave, not only the oil that has surfaced but also water there beneath tends to flow into the casing A97 even if the liquid level is adjusted. Since a diaphragm pump is used, the oil/water mixture contains air. Further, if an inflow rate of the oil/water mixture is high, the oil/water mixture flows into the separation tank 48 like a waterfall to generate air bubbles and the liquid level is not stable. In order to cope with these, a deaeration mechanism is further provided which reduces speed of the oil/water mixture within the interconnecting tube and exhausts air through the opening 94. Thus, the oil/water mixture smoothly flows into the separation tank 48 from the lead pipe 93 so as not to agitate the liquid surface.

Example 6

Figure 18:
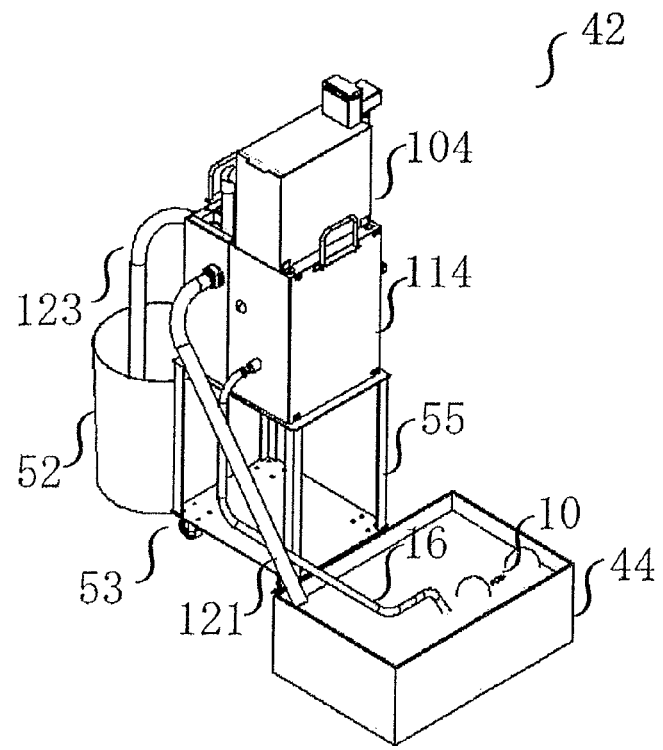
FIG. 18 is a perspective view showing an embodiment of the floating oil collecting system in Example 6 in accordance with the present invention.
Figure 19:
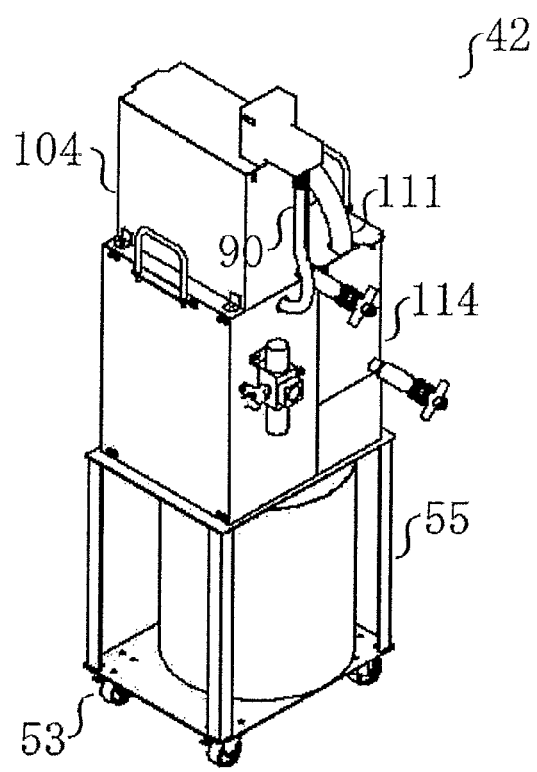
FIG. 19 is a perspective view showing components in Example 6.
Figure 20:
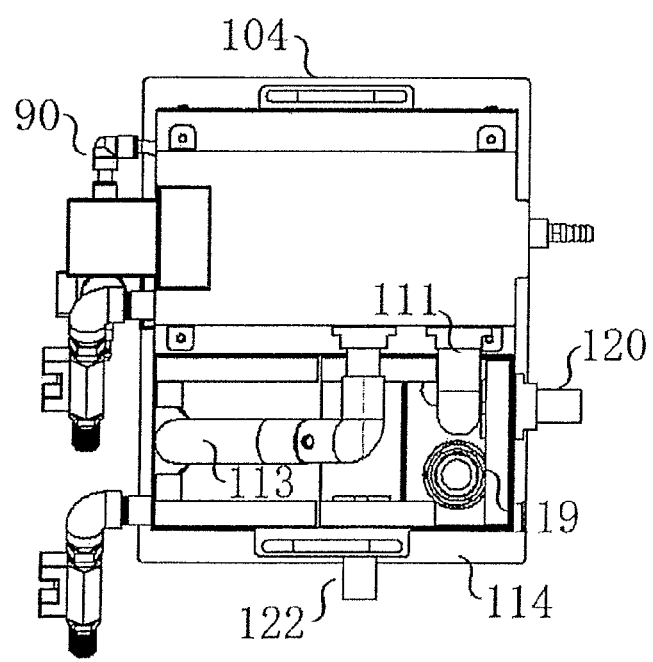
FIG. 20 is a plan view showing the components in Example 6.
Figure 21:
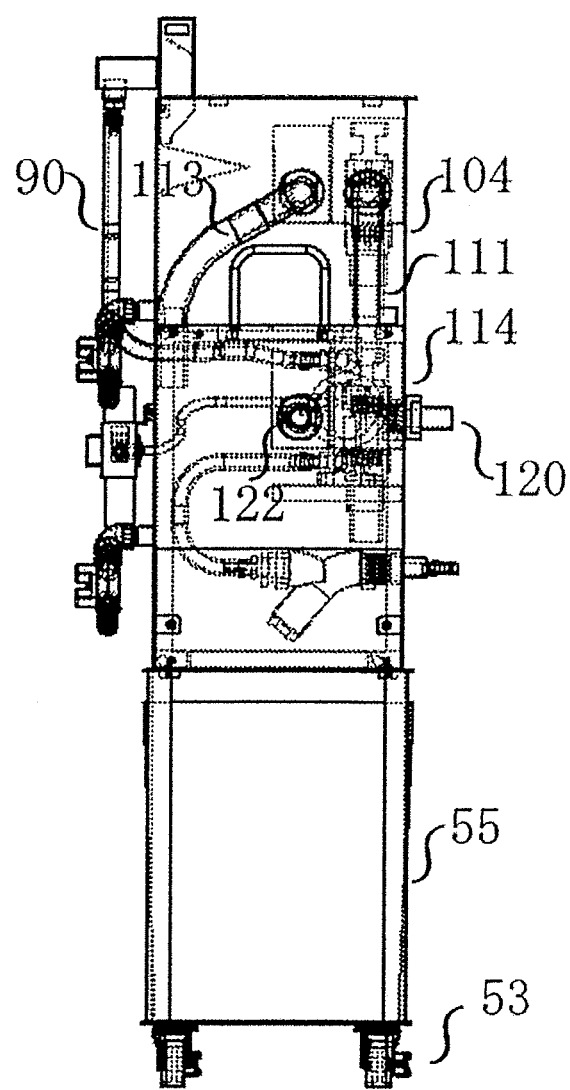
FIG. 21 is a side view showing the components in Example 6.
Figure 22:
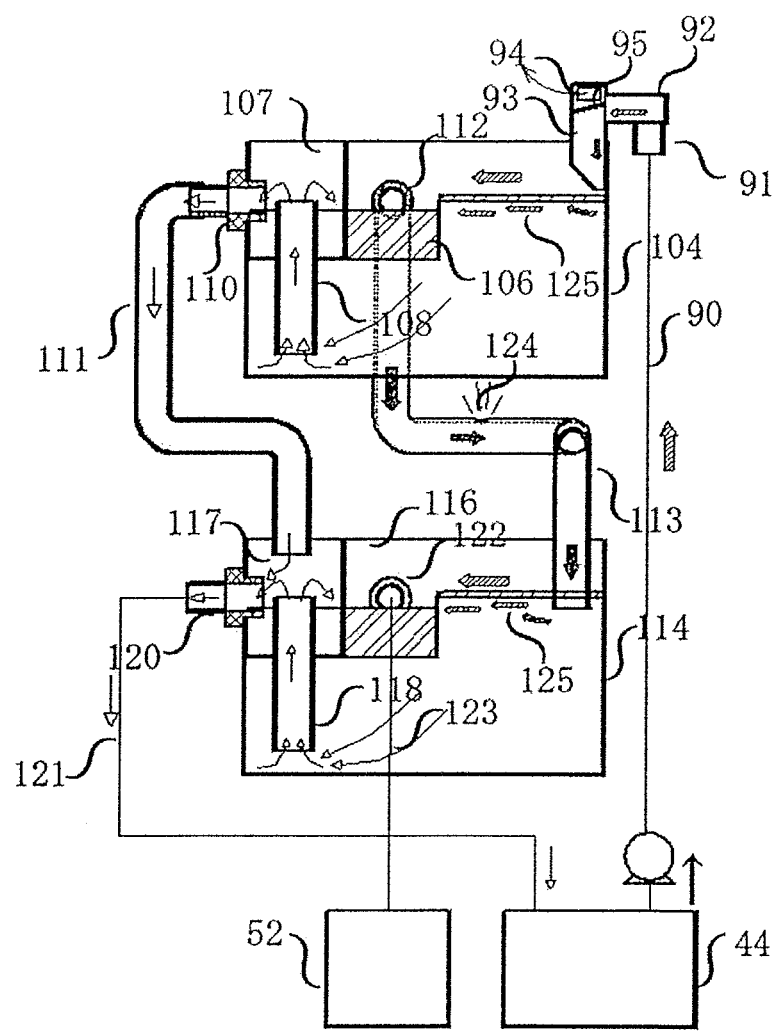
FIG. 22 is a schematic diagram of Example 6.

FIG. 18 is a perspective view showing an embodiment of the floating oil collecting system in Example 6; FIG. 19 is a perspective view showing components in Example 6; FIG. 20 is a plan view showing the components in Example 6; FIG. 21 is a side view showing the components in Example 6; FIG. 22 is a schematic diagram of the floating oil collecting apparatus in Example 6. In Example 5, a lot of bubbles may be generated at the upper part of oil stored in the casing A97 depending on the properties of oil or liquid. The bubbles contain much moisture. As the bubbles disappear over time, water increases. This problem cannot be solved by adjusting the liquid level or inhibiting the agitation of the liquid surface as described in the Example 5. The floating oil collecting system where the countermeasure to the bubbles is taken is illustrated in Example 6.

As shown in FIG. 22, the floating oil collecting system where the countermeasure to the bubbles is different from a conventional floating oil collecting system in that two separation tanks are provided and connected together.

As shown in FIGS. 18 to 21, a separation tank A104 is arranged in a position higher than a separation tank B114 so that the oil/water mixture may flow smoothly. As shown in FIG. 22, it is arranged that, at least, a lower end of a separation tank A oil outlet 112 is located in a higher position than an upper end of the separation tank B114. Horizontal arrangement of the separation tank A and the separation tank B is considered to adjust a separation tank B liquid level adjustment pipe 119.

In other words, in addition to the above-mentioned separation tank A104, the second separation tank B114 is provided below bottom sides of the oil outlet 112 and an outflow port 110 of the above-mentioned separation tank A104.

Further, a discharge pipe 113 is provided which is provided above the above-mentioned the second separation tank B114, causes the floating oil to flow into the above-mentioned the second separation tank, and is connected to the outflow port of the above-mentioned the casing A.

Furthermore, a casing C116 is provided in the above-mentioned second separation tank B114, a top is open, an upper end of a side on the above-mentioned lead pipe side is located below the upper end of the above-mentioned second separation tank, an upper end of the other side is flush with an upper end of the above-mentioned second separation tank, and left and right sides viewed from the discharge pipe side are joined to the inner walls of the above-mentioned second separation tank, so as to discharge the floating oil floating in the above-mentioned second separation tank from the discharge pipe side end face.

Still further, a casing D is provided in which a top is open, an upper end is flush with the upper end of the above-mentioned second separation tank B114, a side on the above-mentioned discharge pipe side is joined to the opposite side with respect to the above-mentioned discharge pipe of the above-mentioned casing C, and other sides are joined to the inner walls of the above-mentioned second separation tank.

Yet further, an outflow pipe 111 arranged above the above-mentioned casing D to cause water flowing out of the casing B to flow into the casing D, a hollow pipe 118 vertically projecting through and upstandingly joined to the bottom of the above-mentioned casing D, its upper surface being externally screw threaded, the water separated by the above-mentioned second separation tank flowing through the pipe, and a liquid level adjustment pipe (not shown) internally screw threaded to be threadedly engaged with threads at the upper external surface of the above-mentioned hollow pipe are provided.

Further, a discharging port 122 provided at a side of the above-mentioned casing C to discharge the floating oil in the above-mentioned casing C, a discharging hose 123 connected with the above-mentioned discharging port 122 to lead the floating oil in the above-mentioned casing C to a collecting container, an outflow port 120 provided at a side of the above-mentioned casing D so as to cause water received from the above-mentioned hollow pipe to flow out, and an outflow hose 121 connected with the above-mentioned outflow port so as to lead the above-mentioned separated water to an arbitrary part are provided.

Usual oil/water separation is performed in the separation tank A104. In a situation where a lot of bubbles are floating on the upper surface of oil stored in a casing A106 of the separation tank A, the above-mentioned bubbles flow into a separation tank A oil drain pipe 113 from the separation tank A oil outlet 112, flow through the separation tank A oil drain pipe 113, and flow into the separation tank B114. Oil/water separation is again performed in the separation tank B114. Since such a time period is added to the time period the bubbles flow into the separation tank B casing C116, it is possible to secure sufficient time for the bubbles to burst and return to water. Thus, the bubbles hardly flow into the separation tank B casing C116, but only oil is stored, and finally only oil can be collected.

Unlike a conventional discharging hose, the first separation tank oil drain pipe 113 is provided a separation tank A oil drain pipe opening 124 at the upper part in the middle of piping. Provision of the opening allows the bubbles to disappear easily. The reason for providing the separation tank A oil drain pipe opening 124 at the upper part is to prevent the fluid from spilling.

INDUSTRIAL APPLICABILITY

The apparatus for collecting oil surfaced to the liquid level of the oil/water mixture, such as working fluid and washings, is provided with the liquid-level following type suction apparatus, the deaerator, the separation tank, and the pump, to thereby collect oil containing much less water.

EXPLANATION OF REFERENCE SIGNS

10: liquid-level following type suction apparatus (Example 1)
12: liquid-level following type suction apparatus (Example 2)
13: liquid-level following type suction apparatus (Example 3)
14: liquid-level following type suction apparatus (Example 4)
16: suction hose
18: intake pipe
18a: inlet side end
20: extension portion
21a: central hole
21b: attachment hole
21c: attachment hole
22: holding member
23: cylindrical holder
24: wing bolt
25: liquid level
26: float body
28: upper end opening edge
30: adjustment pipe
32: strip-like stopper
32a: attachment hole
33: attaching screw
34: clearance
36: washer
38: pan
39: connection member
40: plate-like stopper
42: floating oil collecting system
44: storage tank
46: oil/water mixture
48: separation tank
50: discharging hose
52: collecting container
53: caster
54: outflow hose
55: frame
56: arrow
57: arrow
58: arrow
60: floating oil
62: water 64: adjustment pipe
66: attachment hole
68: nut
70: bolt
72: arrow
74: arrow
76: arrow
80: cylindrical holder
82: wing bolt
84: spiral recess
90: inflow hose
91: inflow pipe
92: guide pipe
93: lead pipe
94: opening
95: whirl stop
97: casing A
98: casing B
99: casing B hollow pipe
100: liquid level adjustment pipe
101: water-recycling outlet
102: water-recycling hose
103: oil outlet
104: separation tank A
106: separation tank A casing A
107: separation tank A casing B
108: separation tank A casing B hollow pipe
109: separation tank A liquid level adjustment pipe
110: separation tank A water-recycling outlet
111: separation tank A water-recycling hose
112: separation tank A oil outlet
113: separation tank A oil drain pipe
114: separation tank B
116: separation tank B casing C
117: separation tank B casing D
118: separation tank B casing D hollow pipe
119: separation tank B liquid level adjustment pipe
120: separation tank B water-recycling outlet
121: separation tank B water-recycling hose
122: separation tank B oil outlet
123: separation tank B drain hose
124: separation tank A oil drain pipe opening
125: arrow

The invention claimed is:

1. A liquid-level following type suction apparatus comprising an intake pipe in which one end is an inlet side end opening upwardly and the other end is connected with a suction hose which communicates with an inlet port of a pump, a holding member fixed to said intake pipe and having an extension portion which extends outwardly, a float body attached to said extension portion of said holding member and causing said inlet side end of said intake pipe to closely follow a liquid level within the liquid, and an adjustment pipe which is loosely fitted to said inlet side end of said intake pipe through a clearance so as to move up and down, its upper opening edge serving as an inlet opening, wherein
said liquid flows from the lower end of said adjustment pipe into said clearance between the adjustment pipe and the intake pipe, said liquid rises within the clearance and is sucked into the intake pipe, and said liquid is sucked from an upper end side of said adjustment pipe into the intake pipe.

2. A liquid-level following type suction apparatus as claimed in claim 1, characterized in that a washer is provided in a position to face a bottom end face of said adjustment pipe of said holding member, said washer placing thereon said adjustment pipe so as not to shut a clearance between said intake pipe and said adjustment pipe.

3. A liquid-level following type suction apparatus as claimed in claim 1, characterized by comprising a strip-like stopper in which one end is fixed to said holding member, and the other end is arranged to face an outer end face of said adjustment pipe at a predetermined distance so as to prevent said adjustment pipe from escaping.

4. A liquid-level following type suction apparatus as claimed in claim 1, characterized in that said adjustment pipe is a tubular member formed of a resin with a specific gravity of greater than one (1) and has an inner diameter larger than an outer diameter of said upper end of said intake end pipe.

5. A floating oil collecting system having the liquid-level following type suction apparatus as claimed in claim 1, comprising:
a separation tank which receives an oil/water mixture from the storage tank and separates the mixture into floating oil and water by the difference in specific gravity,
a suction hose in which one end is connected with the inlet port of said pump and the other end is connected with the intake pipe of said liquid-level following type suction apparatus,
a lead pipe which is arranged in the vertical direction at an upper part of said separation tank, its upper end being closed, and its lower end being open,
an inflow pipe in which one end is connected to a discharge port of said pump and the other end is connected to a portion of said lead pipe projecting from an upper surface of said separation tank, and
an opening which is provided for said lead pipe and causes the air contained in said oil/water mixture to escape outside.

6. A floating oil collecting system as claimed in claim 5, characterized in that said lead pipe is arranged at an upper part said separation tank so as to be vertical and fixed to an inner wall of said separation tank,
said inflow pipe is arranged outside said separation tank so as to be vertical, joined, from a lower part, to an interconnecting tube joined to said lead pipe, and connected with said lead pipe through said interconnecting tube,
a board is provided which is inclined upwardly to said interconnecting part from an opposite wall of said lead pipe opposed to an interconnection part between said interconnecting tube and said lead pipe,
a clearance is provided between a tip of said upwardly-inclined board and said interconnecting tube,
said opening is provided above the inter connection part of said lead pipe at said interconnecting tube, and
a cross-sectional area of a lower part of said lead pipe is arranged to be gradually reduced towards its tip.

7. A floating oil collecting system as claimed in claim 5, characterized by comprising a casing A, provided in said separation tank, in which a top is open, an upper end of a side on said lead pipe side is located below the upper end of said separation tank, an upper end of the other side is flush with an upper end of said separation tank, left and right sides viewed from the lead pipe side are joined to the inner walls of the separation tank, so as to receive the floating oil floating in said separation tank from said lead pipe side end face; a casing B in which a top is open, an upper end is flush with the upper end of said separation tank, a side on the lead pipe side is joined to the opposite side with respect to the lead pipe of said casing A, and other sides are joined to the inner walls of said separation tank; a hollow pipe vertically projecting through and upstandingly joined to the bottom of said casing B, its upper surface being externally screw threaded, the water separated by said separation tank flowing through the pipe; a liquid level adjustment pipe internally screw threaded to be threadedly engaged with threads at the upper external surface of said hollow pipe; a discharging port provided at a side of said casing A to discharge the floating oil in said casing A; a discharging hose connected with said discharging port to lead the floating oil in said casing A to a collecting container; an outflow port provided at a side of said casing B so as to cause water received from said hollow pipe to flow out; and an outflow hose connected with said outflow port so as to lead said separated water to an arbitrary part.

8. A floating oil collecting system as claimed in claim 5, characterized by comprising:
in addition to said separation tank, a second separation tank provided below bottom sides of an outflow port and a discharging port of said separation tank;
a discharge pipe connected to a discharging port of a casing A provided above said second separation tank so as to cause the floating oil to flow into said separation tank;
a casing C provided in said second separation tank in which a top is open, an upper end of a side on said discharge pipe side is located below an upper end of said second separation tank, upper ends of other sides are flush with the upper end of said second separation tank, left and right sides viewed from the discharge pipe side are joined to inner walls of said second separation tank, and the floating oil floating in said second separation tank is discharged from said discharge pipe side;
a casing D in which a top is open, an upper end is flush with the upper end of said second separation tank, a side of said discharge pipe side is joined to the opposite side with respect to said discharge pipe of said casing C, and other sides are joined to the inner walls of said second separation tank;
an outflow pipe arranged above said casing D to cause water flowing out of a casing B to flow into the casing D;
a hollow pipe vertically projecting through and upstandingly joined to the bottom of said casing D, its upper surface being externally screw threaded, the water separated by said second separation tank flowing through the pipe;
a liquid level adjustment pipe internally screw threaded to be threadedly engaged with threads at the upper external surface of said hollow pipe;
a discharging port provided at a side of said casing C to discharge the floating oil in said casing C;
a discharging hose connected with said discharging port to lead the floating oil in said casing C to a collecting container;
an outflow port provided at a side of said casing D so as to cause water received from said hollow pipe to flow out; and
an outflow hose connected with said outflow port so as to lead said separated water to an arbitrary part.

9. A floating oil collecting system as claimed in claim 8, characterized in that an upper surface near the discharging port of the discharge pipe connected to the discharging port of the casing A of said separation tank is provided with an opening for exhausting gas, a configuration fixing said lead pipe to the inner wall of said separation tank by a nut and bolt arrangement to be easily detachable and is arranged so that a plurality of attachment holes are provided in the vertical direction and a plurality of vertical attachment positions are provided to be selected, and said second separation tank arranged under said separation tank is disposed in a position in which a space is left at an upper part so that operation of said liquid level adjustment pipe of said second separation tank may be performed.

10. A liquid-level following type suction apparatus, comprising an intake pipe arranged to be upstanding, its upper end being connected with a suction hose which communicates with an inlet port of a pump, a holding member fixed to said intake pipe and having an extension portion which extends outwardly, a float body which is attached to said extension portion of said holding member and causes a bottom part of said intake pipe to closely follow a liquid level in the liquid, a pan spaced from the bottom part of said intake pipe by a suitable distance, and an adjustment pipe which is loosely engaged with the outer periphery of said pan through a clearance so as to move up and down, its top opening edge acting as the inlet port, wherein
said liquid flows from the lower end of said adjustment pipe into said clearance between the adjustment pipe and said pan, rises within the clearance and is sucked into the intake pipe, as well as sucked from an upper end side of said adjustment pipe into the intake pipe.

11. A liquid-level following type suction apparatus as claimed in claim 10, characterized in that said pan is arranged to face, in the liquid, the bottom part of said intake pipe and its rim surrounds the bottom part of said intake pipe.

12. A liquid-level following type suction apparatus as claimed in claim 10, characterized by comprising a plate-like stopper which is arranged to face the bottom of said pan at a predetermined distance so as to prevent said adjustment pipe from escaping.

13. A liquid-level following type suction apparatus as claimed in claim 10, characterized in that said adjustment pipe is a tubular member formed of a resin with a specific gravity of greater than one (1) and has an inner diameter larger than an outer diameter of said pan.

* * * * *